US007251358B2

(12) United States Patent
Haikin

(10) Patent No.: US 7,251,358 B2
(45) Date of Patent: Jul. 31, 2007

(54) COLOR MEASUREMENT PROFILE WITH EMBEDDED CHARACTERIZATION

(75) Inventor: John Haikin, Fremont, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 592 days.

(21) Appl. No.: 10/705,920

(22) Filed: Nov. 13, 2003

(65) Prior Publication Data

US 2005/0105106 A1 May 19, 2005

(51) Int. Cl.
*G06K 99/00* (2006.01)

(52) U.S. Cl. .................. 382/162; 382/165; 382/166; 382/167

(58) Field of Classification Search .............. 382/162, 382/166, 165, 167, 164; 702/85; 719/319; 358/504, 518, 1.9, 1.15; 345/426, 593; 250/559.04; 356/407, 408, 425, 73, 429; 348/92, 126, 348/180
See application file for complete search history.

(56) References Cited

U.S. PATENT DOCUMENTS

| | | | | |
|---|---|---|---|---|
| 5,103,407 A | | 4/1992 | Gabor ........................ 345/601 |
| 6,043,909 A | * | 3/2000 | Holub ........................ 358/504 |
| 6,075,888 A | | 6/2000 | Schwartz .................... 382/167 |
| 6,088,038 A | | 7/2000 | Edge et al. ................. 345/600 |
| 6,108,442 A | | 8/2000 | Edge et al. ................. 382/167 |
| 6,263,291 B1 | * | 7/2001 | Shakespeare et al. ......... 702/85 |
| 6,307,961 B1 | * | 10/2001 | Balonon-Rosen et al. .. 382/167 |
| 6,362,808 B1 | | 3/2002 | Edge et al. .................. 345/69 |
| 6,396,593 B1 | | 5/2002 | Laverty et al. ............ 358/1.15 |
| 6,421,050 B1 | | 7/2002 | Ruml et al. ................. 345/426 |
| 6,430,311 B1 | | 8/2002 | Kumada ..................... 382/162 |
| 6,437,792 B1 | | 8/2002 | Ito et al. ..................... 345/600 |
| 6,477,318 B2 | | 11/2002 | Ishii ............................. 386/95 |
| 6,480,299 B1 | | 11/2002 | Drakopoulos et al. ....... 358/1.9 |
| 6,535,298 B2 | | 3/2003 | Winter et al. .............. 358/1.16 |
| 6,961,461 B2 | * | 11/2005 | MacKinnon et al. ........ 382/164 |
| 7,032,227 B2 | * | 4/2006 | Wilkinson et al. .......... 719/319 |
| 2001/0012396 A1 | | 8/2001 | Kumada ..................... 382/162 |
| 2001/0038468 A1 | | 11/2001 | Hiramatsu .................. 358/464 |
| 2001/0044801 A1 | | 11/2001 | Senn et al. ............. 707/104.1 |

(Continued)

FOREIGN PATENT DOCUMENTS

WO 01/89202 A2 11/2001
WO 02/080523 A2 10/2002

*Primary Examiner*—Anh Hong Do
(74) *Attorney, Agent, or Firm*—Fitzpatrick, Cella, Harper & Scinto

(57) ABSTRACT

A data structure by which a color management system can model color behavior of a color device. More particularly, the data structure includes a measurement component including a collection of measurements, where each measurement represents at least one control signal by which a sample color measurement is obtained by effecting a corresponding color output from or input to the color device, or a set of color coordinates which correlate to the at least one control signal, or both. The data structure also includes a characterization process component which includes platform-independent code for a characterization process by which the collection of measurements is processed to produce a color behavior model for the color device. The invention preferably includes a control parameter component which includes control parameters representing a type or state of the device, where the characterization process component processes the collection of measurements in accordance with the control parameters, in order to generate a color transform corresponding to the type or state of the color device.

16 Claims, 5 Drawing Sheets

U.S. PATENT DOCUMENTS

| | | | |
|---|---|---|---|
| 2001/0053247 A1 | 12/2001 | Sowinski et al. | 382/162 |
| 2002/0003903 A1 | 1/2002 | Engeldrum et al. | 382/233 |
| 2002/0105660 A1 | 8/2002 | Haikin | 358/1.9 |
| 2003/0058253 A1 | 3/2003 | Edge et al. | 345/600 |

* cited by examiner

COLOR MEASUREMENT PROFILE WITH EMBEDDED CHARACTERIZATION

BACKGROUND OF THE INVENTION

1. Field of the Invention

This invention relates to the field of color management, and specifically relates to color management in which a device profile stores both a characterization process and measurement data.

2. Description of the Related Art

Traditional color management systems (CMSs) use characterizations of color imaging devices to derive color transformations that transform color coordinates between a device-dependent color space that depends on the device, and a device-independent color space that does not depend on the device, such as a "profile connection space" ("PCS"). The characterizations are often stored in device profiles, such as those standardized by the International Color Consortium (ICC). Standardized device profiles, however, are inflexible because they must conform to a predefined specification.

More recent CMSs utilize actual device measurements, which are sometimes referred to as "measurement-only profiles" (MOPs), even though this description is not strictly accurate. MOPs are used to drive the color conversion process, rather than relying on device profiles which may be generated by other programs. Although MOPs are advantageous because of their flexibility, their very flexibility leads to further problems. One such disadvantage, for example, is that MOPs must rely on pre-arranged characterization processes which define how measurements are obtained from a device and how they are used to generate a color transform. As such, since flexibility is bound by the pre-arranged characterization process, a traditional CMS may be unable to process a device profile in which color measurements are ordered or categorized in a non-standard manner. Furthermore, it may be difficult to add a new MOP characterization process to an existing CMS which may be pre-programmed with the characterization process of only one or just a few MOPs, requiring that new versions of the CMS be created each time a new type of device or device profile is created.

One method of overcoming this problem is to incorporate the device characterization in a "plug-in" to the CMS. Here, the term "plug-in" means a software module which adds a specific feature or service to the CMS, such as the ability for the CMS to recognize a new device profile. Using plug-ins, existing CMSs can be upgraded to handle new devices or device profiles, by executing newer device characterizations as they become available. With plug-ins, however, the plug-able characterization process components must be available to the CMS via a shared network, disk, or the Internet. Moreover, since the CMS that needs the plug-in might be running in any number of different and incompatible computer platforms, the plug-in must be published in multiple different platform-dependent formats so that one format can be selected consistent with the computer platform on which the CMS is operating.

SUMMARY OF THE INVENTION

It is an object of the invention to address disadvantages found in prior art CMSs.

In one aspect of the present invention, a data structure used by a CMS to model color behavior of a color device stores both a measurement component and a characterization process component. The data structure is preferably stored as a device profile in ICC format, using custom tags.

In more detail, the measurement component includes a collection of measurements, where each measurement represents at least one control signal by which a sample color measurement is obtained by effecting a corresponding color output from or input to the color device, or a set of color coordinates which correlate to the control signals, or both.

The characterization process component includes platform-independent code for a characterization process by which the collection of measurements is processed to produce a color behavior model for the color device. The platform-independent code is a platform-independent language, such as Java or an intermediate language like Microsoft Intermediate Language (MSIL), so that the CMS can extract the platform-independent code, just-in-time compile or interpret the code to the native machine, and execute the characterization process on the measurement data, all to generate a color transform that transforms color coordinates between a device-dependent color space and a device-independent color space.

Because the invention stores both a measurement component and a characterization process component by which measurements are processed, the invention provides flexibility to the CMS, since the CMS can find the information it needs to generate a transform in the data structure itself. Furthermore, by storing the characterization process in platform-independent code, any CMS can use it to generate color transforms, regardless of the platform on which the CMS is running. As such, by packaging both measurement data and a characterization process in a single data structure, the data structure provides excellent extensibility for CMSs that use it, while ensuring that color characterization results are reproducible.

In a further preferred embodiment, the data structure also includes a control parameter component, which includes control parameters. The control parameter component may include user-selectable settings, such as brightness or contrast settings, or data indicative of the type or state of the device, such as dithering or halftone settings, or the type of ink cartridge installed. Other control parameters or viewing conditions which may affect how the color management system models color behavior, such as adopted white point, may also be included in the control parameter component.

By adding a control parameter component to the present invention, the characterization process component may provide for a characterization process which processes measurement data over a wider range of user-selectable settings. Specifically, a color transform can be generated for a device, such as a printer, taking into account the condition or state of the device, such as whether the printer has a black ink, three color, four color or photo-ink cartridge installed.

In a related aspect of the present invention, a CMS which generates a color transform to model color behavior of a color device includes a program memory and a processor, and the program memory stores a data structure including a measurement component and a characterization process component. The measurement component includes a collection of measurements, where each measurement represents at least one control signal by which a sample color measurement is obtained by effecting a corresponding color output from or input to the color device, or a set of color coordinates which correlate to the control signals, or both. The characterization process component includes platform-independent code for a characterization process which processes the collection of measurements to produce a color behavior model for the color device. The processor compiles or interprets the platform-independent code stored in the program memory, and executes the compiled or interpreted code on the measurement component to generate the color transform.

The invention also contemplates the generation of a data structure by which color behavior is modeled, and the generation of a color transform using a data structure by which color behavior of a color device is modeled to generate a color transform.

In more detail, the generation of a data structure by which color behavior of a color device is modeled includes a measuring step and storing steps. Color data for the color device is measured, where the color data represents at least one control signal by which a sample color measurement is obtained by effecting a corresponding color output from or input to the color device, or a set of color coordinates which correlate to the at least one, or both. The color data is stored in a measurement-only profile in a measurement component, and the platform-independent code by which the measurement-only profiles are used to generate a color transform are stored, in a characterization process component.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
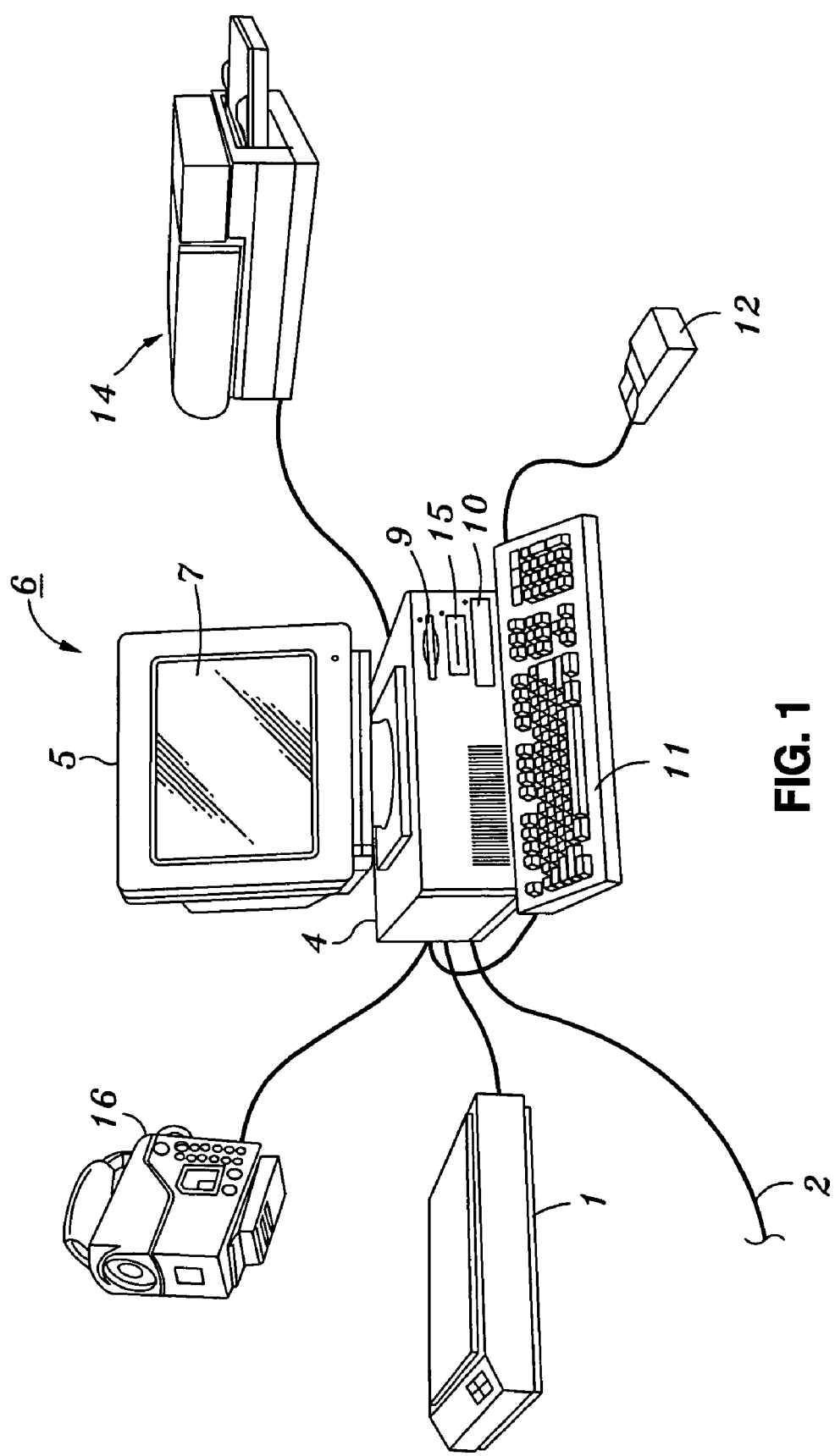
FIG. 1 depicts the exterior appearance of one embodiment of the invention.

FIG. 1 is a view showing the exterior appearance of one embodiment of the invention. Specifically, FIG. 1 depicts computing equipment 6, which includes host processor 4 which comprises a personal computer (hereinafter "PC") preferably having a windowing operating system such as Microsoft Windows XP®, Xwindows®, or MacIntosh® operating systems. Provided with computing equipment 6 are color monitor 5 including display screen 7 for displaying text and images to a user, keyboard 11 for entering text data and user commands into PC 4, and pointing device 12. Pointing device 12 preferably comprises a mouse, for pointing, selecting and manipulating objects displayed on display screen 7.

Computing equipment 6 includes a computer readable memory medium such as floppy disk drive 9 and/or fixed disk 10 and/or CD-ROM drive 15. Such computer readable memory media allow computing equipment 6 to access information such as image data, computer-executable process steps, application programs, and the like, stored on removable and non-removable memory media. In addition, network access 2 allows computing equipment 6 to acquire information, images and application programs from other sources, such as a local area network or the Internet. Scanner 1 and digital camera 16 allow computing equipment 6 to capture digital images. Digital camera 16 is a digital still camera or a digital video camera.

Printer 14 is a color output device such as an ink jet printer or color laser beam printer. While printer 14 is shown as being directly connected to PC 4, it need not be. Printer 14 may be connected via a network (e.g., wired or wireless network, not shown), for example.

Figure 2:
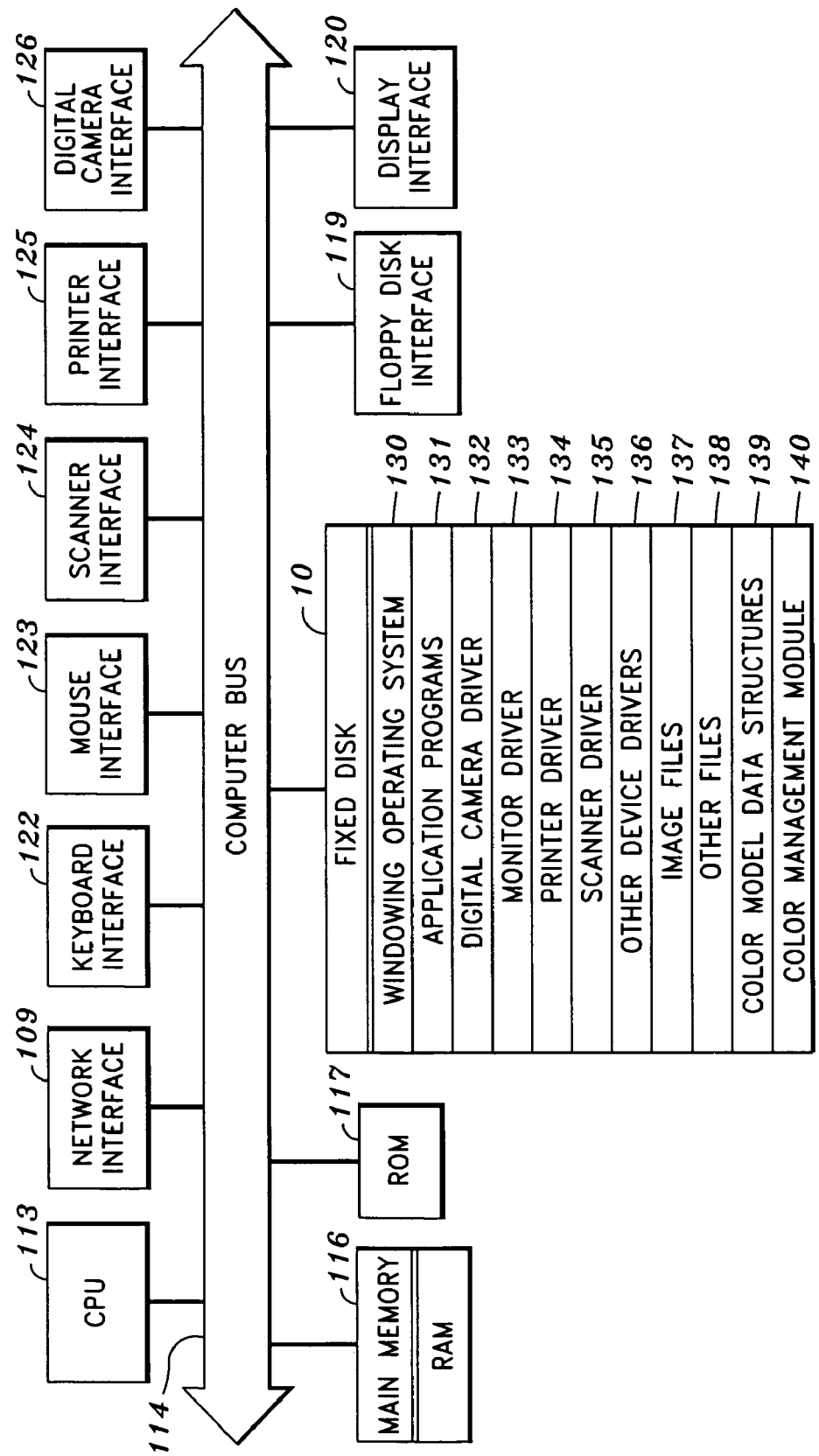
FIG. 2 depicts an example of an internal architecture of the FIG. 1 embodiment.

FIG. 2 is a detailed block diagram showing the internal architecture of the FIG. 1 embodiment. As shown in FIG. 2, PC 4 includes network interface 109 for network access 2, and a central processing unit ("CPU") 113, which is preferably a Pentium-type microprocessor but need not be, that interfaces with computer bus 114. Also interfacing with computer bus 114 are fixed disk 10, random access memory ("RAM") 116 for use as main memory, read only memory ("ROM") 117, floppy disk interface 119 to allow PC 4 to interface with floppy disk drive 9, display interface 120 for interfacing with monitor 5, keyboard interface 122 for interfacing with keyboard 11, mouse interface 123 for interfacing with pointing device 12, scanner interface 124 for interfacing with scanner 1, printer interface 125 for interfacing with printer 14, and digital camera interface 126 for interfacing with digital input device 1.

Main memory 116 interfaces with computer bus 114 so as to provide quick RAM storage to CPU 113 during execution of software programs such as the operating system application programs, and device drivers. More specifically, CPU 113 loads computer-executable process steps from fixed disk 9 or other memory media into a region of main memory 116 in order to execute software programs. Data such as color measurement data can be stored in main memory 116, where the data can be accessed by CPU 113 during execution.

Read only memory 117 stores invariant computer-executable program code, or program or process steps, for basic system functions such as basic input and output (I/O), startup, or reception of keystrokes from keyboard 11.

As also shown in FIG. 2, fixed disk 10 stores computer-executable code for a windowing operating system 130, application programs 131 such as word processing, spreadsheet, presentation, graphics, image processing, gaming, etc. applications.

Fixed disk 10 also stores color management module 140. Color management module (CMM) 140 renders color image data from a source, device-dependent color space into a PCS color image data which is in a device-independent color space, and vice versa. Color management module 140 uses measurement data from color measurement profiles to generate the device transforms necessary to transform color image data into the color space of the destination color image data.

In one example of the process, monitor-specific color data is converted to a printer's color space by first transforming the monitor color data to a device independent color appearance space (e.g., CIELab). A gamut mapping is performed on the CIELab output to map the colors to the gamut of colors of the printer. The gamut-mapped CIELab is then transformed into the printer-specific color space using the printer's device profile.

The measurement data reflects measured color characteristics of the color measurement profile. Among other data, it contains plural pairs of device control values and colorimetric or spectral measurements associated with the device control values. This scheme allows a developer to develop, modify or control CMM 140 in order to achieve a desired rendering intent.

The data structures by which color behavior of a color device is modeled of the present invention are preferably generated by computer-executable process steps which are stored on fixed disk 10 for execution by CPU 113, such as in one of application programs 131 or in CMM 140. The process steps for generating the data structures of the present invention are described in more detail below.

It is also possible to implement a color setting selection module according to the invention as a dynamic link library ("DLL"), or as a plug-in to other application programs such as image manipulation programs like the Adobe® Photoshop™ image manipulation program.

Fixed disk 10 further stores computer-executable code for data application programs 131 that generate the data structures which model color behavior, digital camera driver 132, monitor driver 133, printer driver 134, scanner driver 135, other device drivers 136, image files 137, other files 138, and color model data structures 139.

FIGS. 1 and 2 illustrate one example of a computing system that executes program code, or program or process steps, configured to generate a color transform using a data structure by which behavior of a color device is modeled. Other types of computing systems may also be used as well.

Figure 3:
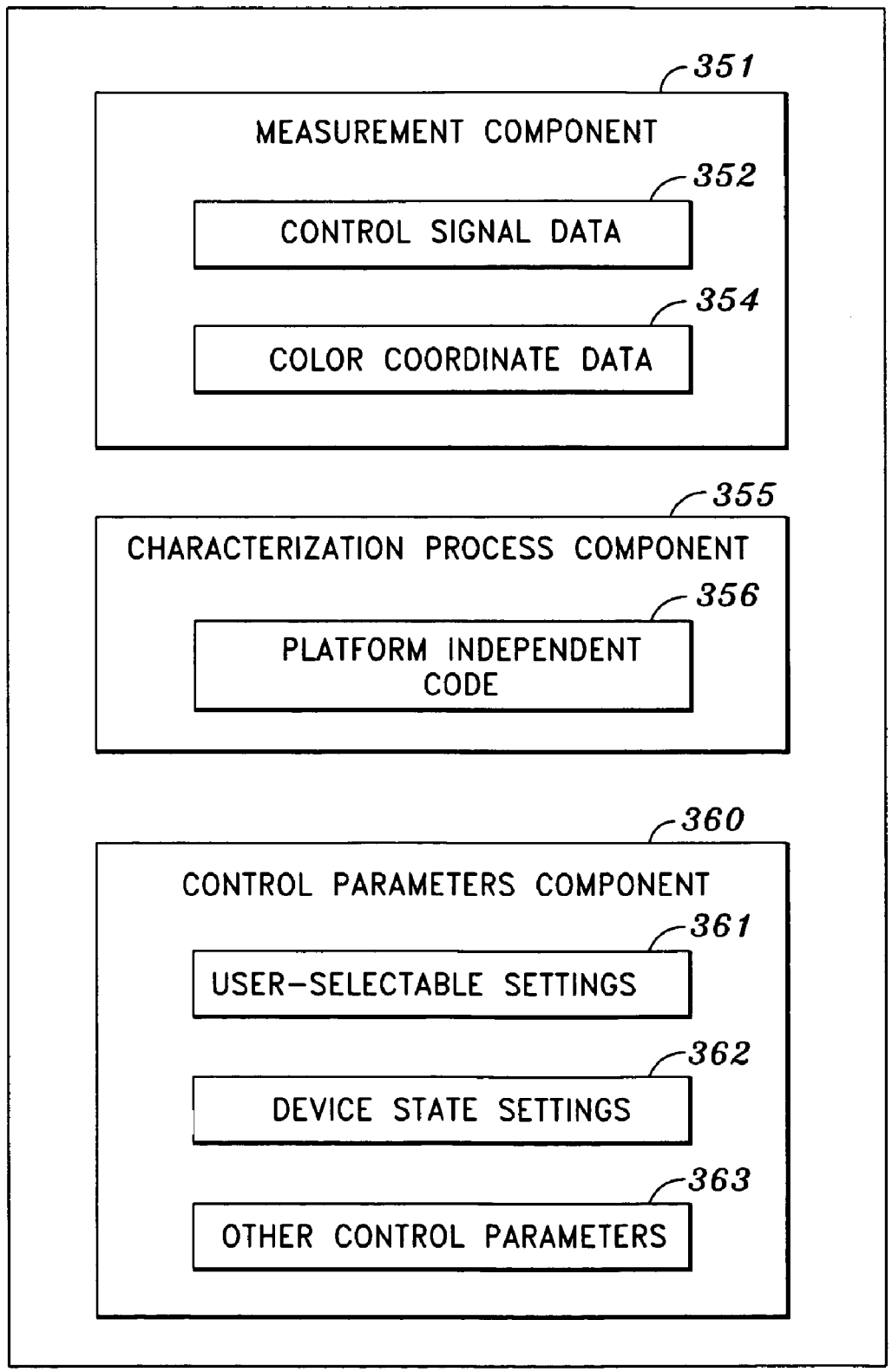
FIG. 3 is a block diagram depicting a data structure used by a color management system to model color behavior of a color device, according to the present invention.

FIG. 3 is a block diagram depicting a data structure used by CMM 140 to model color behavior of a color device, according to the present invention. Briefly, according to this aspect, the data structure includes a measurement component storing a collection of measurements, a characterization process component storing platform-independent code for a characterization process which processes the collection of measurements to produce a color behavior model for the color device. Preferably, a control parameter component is also included for storing control parameters representing a type or state of the color device, or a device viewing condition. The characterization process component processes the collection of measurements in accordance with the control parameters in order to produce a color behavior model for the color device corresponding to the type or state of the color device.

In more detail, the data structure used by a color management system to model color behavior of a color device includes a measurement component 351, which contains measurement data. Measurement component 351 includes a collection of measurements, where each measurement represents at least one control signal by which a sample color measurement is obtained by effecting a corresponding color output from or input to the color device, or a set of color coordinates which correlate to the control signals, or both. Measurement component 351 includes regions for storing control signal data 352 and a measurement of the resulting color whose coordinates are stored in color coordinate data 354.

The measurement component 351 provides a mapping of a device's color definition by correlating a sampling of colors in a device-dependent color space to color measurements of the color samples taken in device-independent color space. The measurements are taken using a measurement device, such as a spectrophotometer or calorimeter. In this embodiment, control signal data 352 comprises device dependent coordinates (such as RGB coordinates) for multiple color patches representative of the full color gamut of the device. Color coordinate data 354 comprises corresponding CIELAB coordinates measured from color patches, such as color patches produced by an output device or color patches captured by a color input device. Although this organization is preferred, others are possible. For example, instead of storing a control signal-color measurement pair, the measurement component 351 can store a 1-dimensional array of control signals which correlate to preselected or standardized set of color measurements.

The data structure also includes a characterization process component 355. The characterization process component 355 stores platform-independent code 356 in a platform-independent language, such as Java or MSIL. The platform-independent code 356 is platform-independent so that the color management system can extract and just-in-time compile or interpret the code to the native processor, and execute the characterization process on the measurement data. The platform-independent code 356 stored in the characterization process component 355 implements an algorithmic model to perform the transformation between color spaces using the measurement data provided in the measurement data component 351. Once executed, the characterization process generates a color transform that transforms color coordinates between a device-dependent color space and a device-independent color space.

By storing both a measurement component 351 and a characterization process component 355 by which measurement data is processed, the present invention provides flexibility to the CMS, since the CMS can find the information it requires to generate a color transform within the data structure itself.

Moreover, by storing the characterization process in platform-independent code, any CMS can generate color transforms, regardless of the platform on which the CMS is running. As such, the data structure provides expanded extensibility for underlying CMSs by packaging both measurement data and platform-independent code in a single data structure, ensuring that color characterization results are readily reproducible.

Furthermore, the data structure preferably includes a control parameters component 360. The control parameters component 360 stores user-selectable settings 361, device state settings 362, and/or other control parameters 363. User-selectable settings includes settings such as brightness and contrast. Device state settings 362 includes data indicative of the type or state of the device, such as dithering or halftone settings, or the type of ink cartridge installed. Other control parameters 363 includes parameters or viewing conditions which may affect how the color management system models color behavior, such as the adopted white point.

By adding a control parameter component, the characterization process component can process measurement data over a expanded range of user-selectable or device state settings. In particular, a color transform can be generated for a device, such as a printer, taking into account the condition or state of the device. For instance, a color transform may be customized depending on whether a printer has a photo-ink cartridge or black ink cartridge, or depending on the type of paper provided.

In an additional preferred aspect, the data structure is stored as a device profile in ICC format, using custom tags.

Figure 4:
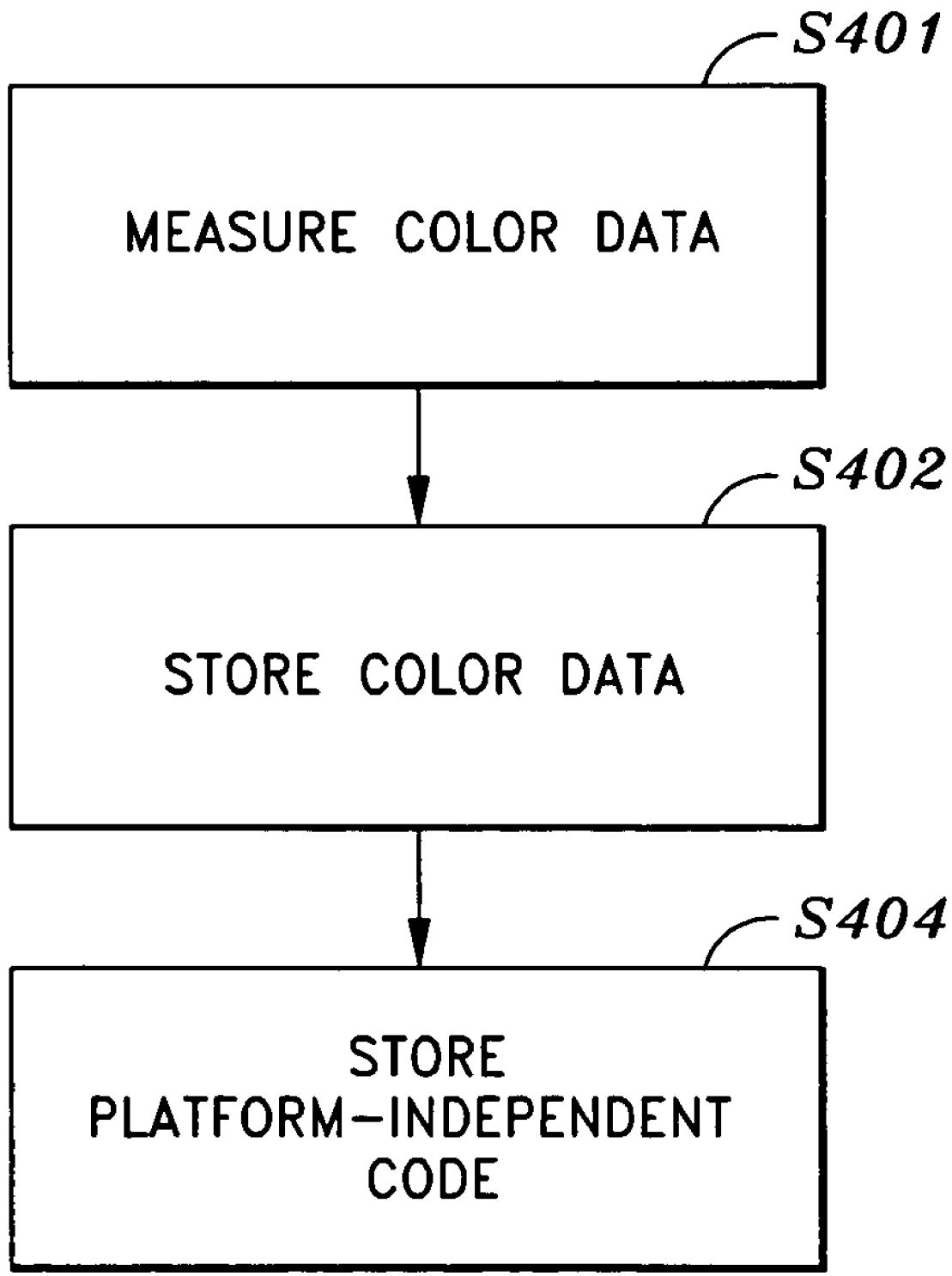
FIG. 4 is a flow chart depicting the process for generating a data structure by which color behavior of a color device is modeled, according to the present invention.

FIG. 4 is a flow chart depicting process steps for generating a data structure by which color behavior of a color device is modeled. Briefly, according to FIG. 4, color data for the color device is measured, where the color data represents at least one control signal by which a sample color measurement is obtained by effecting a corresponding color output from or input to the color device, or a set of color coordinates which correlate to the at least one, or both.

Additionally, color data is stored in a measurement-only profile in a measurement component, and platform-independent code by which the measurement-only profiles are used to generate a color transform is stored in a characterization process component.

In more detail, the method for generating a data structure by which color behavior of a color device is modeled includes a measuring step (step S401). In the measuring step, color data for the color device is measured, where the color data represents at least one control signal by which a sample color measurement is obtained by effecting a corresponding color output from or input to the color device, or a set of color coordinates which correlate to the set of control signals, or both.

As an example, for a color input device such as scanner 1, a collection of color patches are captured by the input device, and the color patches are measured using a device-independent color space. The control signals for the color input device corresponding to each of the color patches can then be paired with the each of the device-independent color measurements, to output device coordinate information.

The method also includes a color data storing step (step S402). In the color data storing step, color data is stored in a measurement-only profile in a measurement component.

Furthermore, the method also includes a platform-independent code storing step (step S404). In the platform-independent code storing step, platform-independent code by which the measurement-only profiles are used to generate a color transform are stored, in a characterization process component.

According to a related aspect of the invention, a color management system is provided which generates a color transform to model color behavior of a color device. Briefly, this color management system includes a program memory for storing a data structure and a processor.

In more detail, the color management system includes a program memory. The program memory includes a measurement component for storing a collection of measurements, wherein each measurement represents at least one control signal by which a sample color measurement is obtained by effecting a corresponding color output from or input to the color device, or a set of color coordinates which correlate to the control signals, or both, and a characterization process component for storing platform-independent code for a characterization process which processes the collection of measurements to produce a color behavior model for the color device. The platform-independent code, stored in the characterization process component, is written in a platform-independent language, such as Java or MSIL.

Additionally, the color management system includes a processor. The processor is for compiling or interpreting the platform-independent code stored in the program memory and executing the compiled or interpreted code on the measurement component to generate the color transform. By using a platform-independent language, the CMS can extract and just-in-time compile or interpret platform-independent code, and the processor can execute the characterization process on the measurement data to generate a color transform that transforms color coordinates between a device-dependent color space and a device-independent color space, regardless of the platform which underlies the CMS.

By storing both the measurement component and the characterization process component in the program memory, the CMS can find the information it needs for the processor to generate a transform, within the CMS itself. Moreover, by storing the characterization process in platform-independent code in the program memory, any CMS can utilize the characterization process to generate color transforms, regardless of the platform on which the CMS is running. As such, by packing both measurement data and a characterization process within the program memory, the CMS is provided with excellent extensibility, while ensuring that color characterization results are reproducible.

Figure 5:
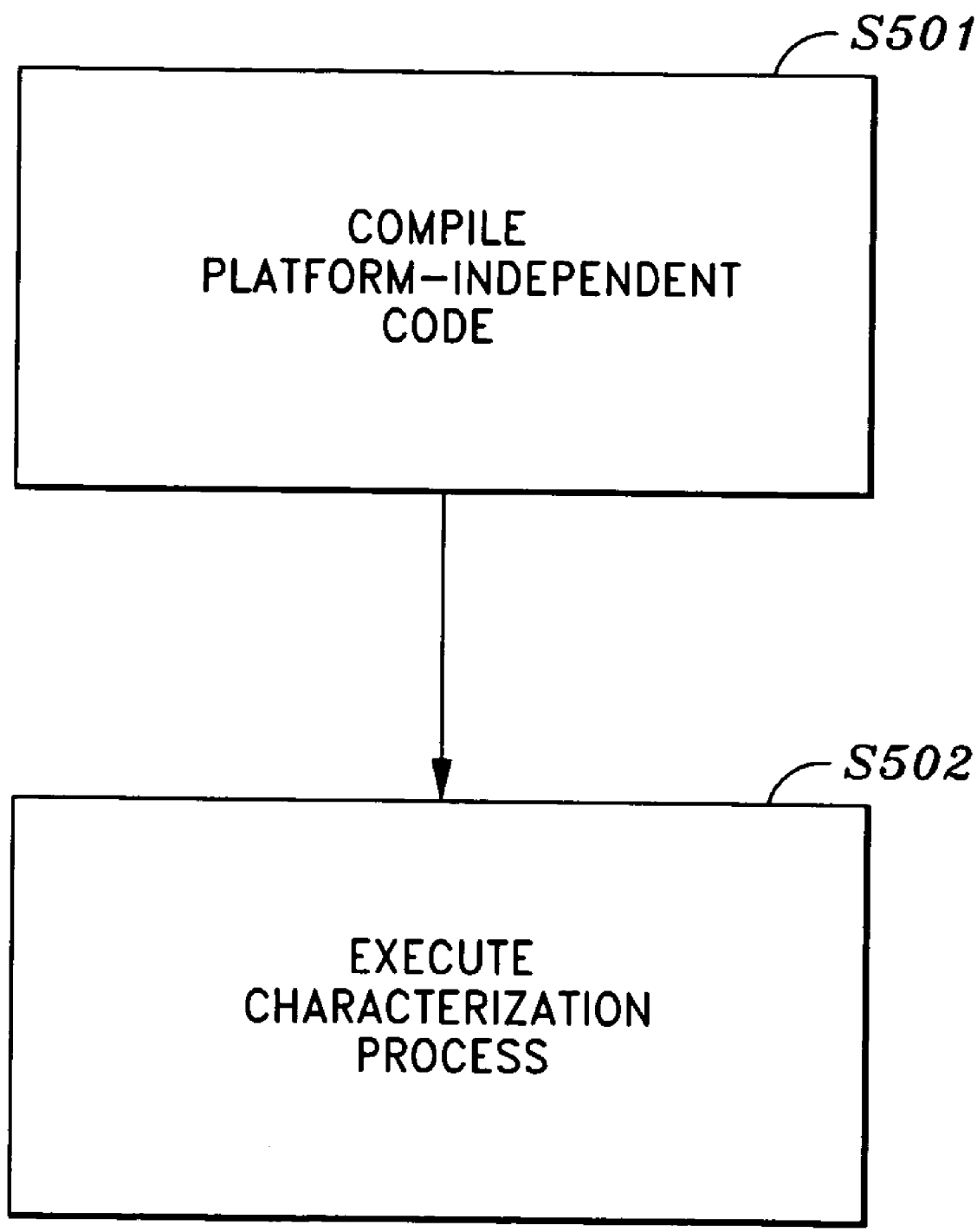
FIG. 5 is a flow diagram for using a data structure to model color behavior of a color device, according to the present invention.

FIG. 5 is a flow diagram for explaining operation of a CMS according to the present invention.

According to this aspect of the invention, a method is provided for generating a color transform using a data structure by which color behavior of a color device is modeled. Briefly, this method includes a compiling step for compiling or interpreting platform-independent code stored in a data structure to output computer-executable code and an execution step for executing the computer-executable code on the measurement component to generate the color transform.

In more detail, the method for generating a color transform using a data structure by which color behavior of a color device includes a compiling step (step S501). The data structure stores a measurement component for storing a collection of measurements, where each measurement represents at least one control signal by which a sample color measurement is obtained by effecting a corresponding color output from or input to the color device, or a set of color coordinates which correlate to the control signals, or both. The data structure also stores a characterization process component for storing the platform-independent code, where the platform-independent code represents a characterization process which processes the collection of measurements to produce a color behavior model for the color device.

In the compiling step (step S501), the CMS extracts and just-in-time compiles or interprets the platform-independent code to the native machine. By coding the characterization process in a platform-independent intermediate language, a CMS can compile or interpret the platform-independent code regardless of the platform on which the CMS is running.

Additionally, the method includes an execution step (step S502). In the execution step, the characterization process is executed on the measurement data, to generate a color transform that transforms color coordinates between a device-dependent color space and a device-independent color space.

Because the invention stores both a measurement component and a characterization process component by which measurements are processed, the invention provides flexibility to the CMS, since the CMS can find the information it needs to generate a transform in the data structure itself. As such, by packaging both measurement data and a characterization process together, the method for generating a color transform using a data structure by which color behavior of a color device according to the present invention provides excellent extensibility for CMSs that use it, while ensuring that color characterization results are reproducible.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A data structure embodied on a computer-readable memory medium, usable by a computer-implemented color management system to model color behavior of a color device, comprising:

a measurement component comprising at least one of control signal data which is in device dependent coordinates and color coordinate data which correlates to said control signal data; and a characterization process component comprising platform-independent code for a characterization process based on the measurement component to produce a color behavior model for the color device.

2. A data structure of claim 1, further comprising:
a control parameter component comprising control parameters representing a type or state of the color device,
wherein said characterization process component processes said measurement component in accordance with said control parameters, in order to produce a color behavior model for the color device corresponding to said type or state of the color device.

3. A data structure of claim 1, wherein said data structure is stored as a device profile in ICC format, using custom tags.

4. A data structure of claim 2, wherein said data structure is stored as a device profile in ICC format, using custom tags.

5. A computer-implemented color management system which generates a color transform for a color device, comprising:
a program memory for storing a data structure comprising (1) a measurement component comprising at least one of control signal data which is in device dependent coordinates and color coordinate data which correlates to said control signal and (2) a characterization process component comprising platform-independent code for a characterization process based on the measurement component to produce a color behavior model for the color device; and
a processor for (1) compiling or interpreting said platform-independent code stored in said program memory and (2) executing the compiled or interpreted code on the measurement component to generate the color transform.

6. A color management system according to claim 5, wherein said program memory further stores a control parameter component comprising control parameters representing a type or state of the color device, and
wherein said characterization process component processes said measurement component in accordance with said control parameters, in order to produce a color behavior model for the color device corresponding to said type or state of the color device.

7. A computer-implemented method of generating a color transform for a color device the method comprising:
a compiling step for compiling or interpreting platform-independent code stored in a data structure to output computer-executable code, where said data structure comprises (1) a measurement component comprising at least one of control signal data which is in device dependent coordinates and color coordinate data which correlates to said control signal, and (2) a characterization process component comprising said platform-independent code, wherein said platform-independent code represents a characterization process based on the measurement component to produce a color behavior model for the color device;
an execution step for executing said computer-executable code on the measurement component to generate the color transform.

8. A method of generating a color transform according to claim 7, wherein said data structure further comprises a control parameter component comprising control parameters representing a type or state of the color device, and
wherein said characterization process component processes said measurement component in accordance with said control parameters, in order to produce a color behavior model for the color device corresponding to said type or state of the color device.

9. A method of generating a color transform according to claim 7, wherein said data structure is stored as a device profile in ICC format, using custom tags.

10. A method of generating a color transform according to claim 8, wherein said data structure is stored as a device profile in ICC format, using custom tags.

11. A computer-implemented method of generating a data structure by which color behavior of a color device is modeled, the method comprising:
obtaining at least one of control signal data which is in device dependent coordinates and color coordinate data which correlates to said control signal data;
storing said at least one of the obtained control signal data and the obtained color coordinate data in a measurement-only profile; and
storing platform-independent code by which the measurement-only profile is used to generate a color transform.

12. A computer-readable storage medium in which is stored a computer-executable program for generating a color transform using a data structure by which color behavior of a color device is modeled, said program comprising codes for controlling the computer to perform:
a compiling step for compiling or interpreting platform-independent code stored in a data structure to output computer-executable code, where said data structure comprises (1) a measurement component comprising at least one of control signal data which is in device dependent coordinates and color coordinate data which correlates to said at least one control signal data, and (2) a characterization process component comprising said platform-independent code, wherein said platform-independent code represents a characterization process based on the measurement component to produce a color behavior model for the color device; and
an execution step for executing said computer-executable code on the measurement component to generate the color transform.

13. A computer-readable storage medium according to claim 12, wherein said data structure further comprises a control parameter component comprising control parameters representing a type or state of the color device, and
wherein said characterization process component processes said measurement component in accordance with said control parameters, in order to produce a color behavior model for the color device corresponding to said type or state of the color device.

14. A computer-readable storage medium according to claim 12, wherein said data structure is stored as a device profile in ICC format, using custom tags.

15. A computer-readable storage medium according to claim 13, wherein said data structure is stored as a device profile in ICC format, using custom tags.

16. A computer-readable storage medium in which is stored a computer-executable program for generating a data structure by which color behavior of a color device is modeled, said program comprising codes for controlling the computer to perform:
a measuring step, for measuring color data for the color device, said color data representing at least one of control signal data which is in device dependent coordinates and color coordinate data which correlates to said control signal data;
a first storing step, for storing said color data in a measurement-only profile in a measurement component; and
a second storing step, for storing platform-independent code by which the measurement-only profile is used to generate a color transform.

* * * * *

UNITED STATES PATENT AND TRADEMARK OFFICE
CERTIFICATE OF CORRECTION

PATENT NO. : 7,251,358 B2
APPLICATION NO. : 10/705920
DATED : July 31, 2007
INVENTOR(S) : John S. Haikin It is certified that error appears in the above-identified patent and that said Letters Patent is hereby corrected as shown below:

Title Page (75) INVENTORS:
"John Haikin" should read -- John S. Haikin --.

COLUMN 5:
Line 40, "parameters" should read -- parameters, --; and
Line 61, "calorimeter" should read -- colorimeter. --.

COLUMN 9:
Line 24, "signal" should read -- signal, --;
Line 33, "color" should read -- computer-implemented color --;
Line 43, "device" should read -- device, --;
Line 55, "device;" should read -- device; and --; and
Line 59, "method" should read -- computer-implemented method --.

COLUMN 10:
Line 1, "method" should read -- computer-implemented method --; and
Line 4, "method" should read -- computer-implemented method --.

Signed and Sealed this

First Day of September, 2009

David J. Kappos
*Director of the United States Patent and Trademark Office*